(No Model.)
J. D. REED & J. CUMMING.
ICE CREAM FREEZER.
No. 243,972. Patented July 5, 1881.
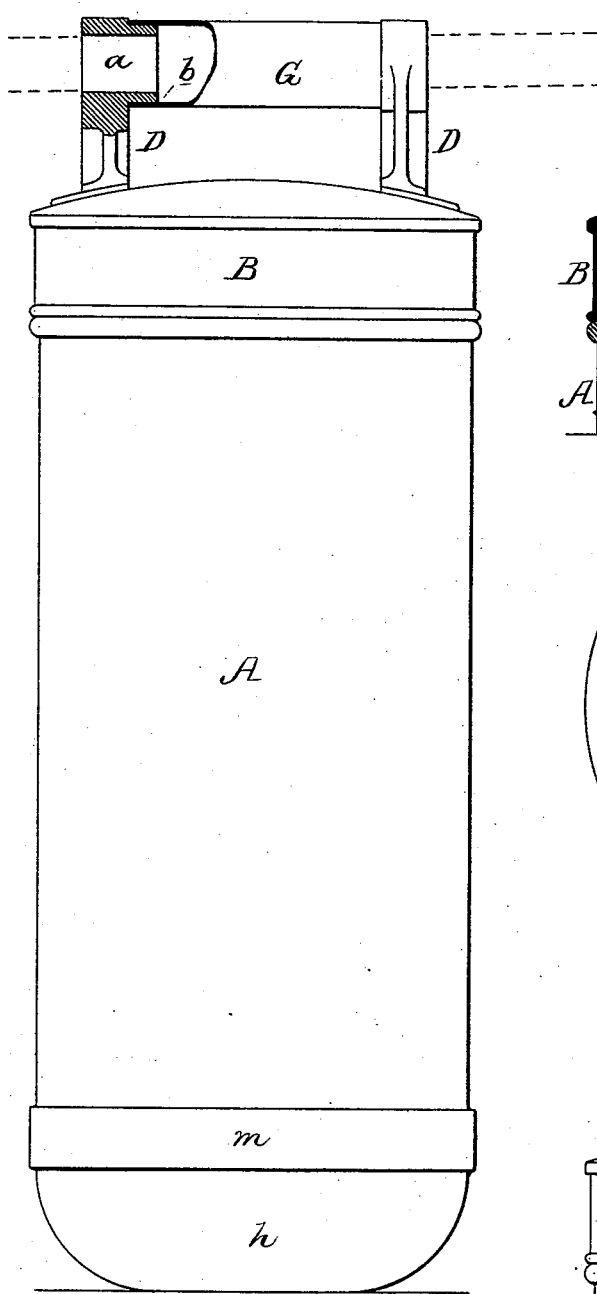
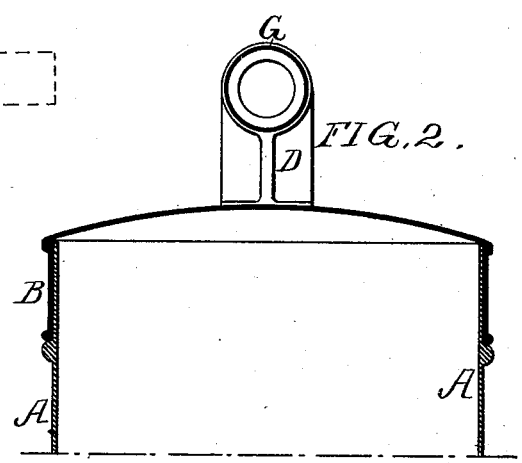
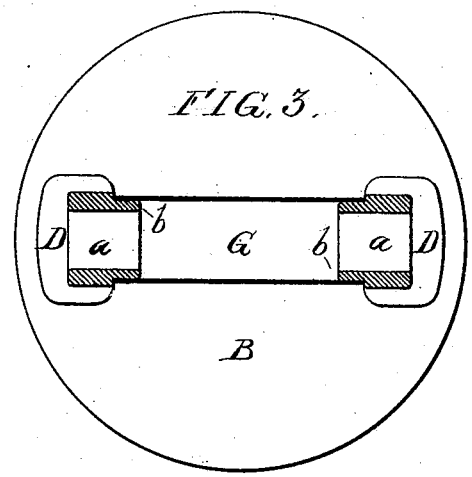
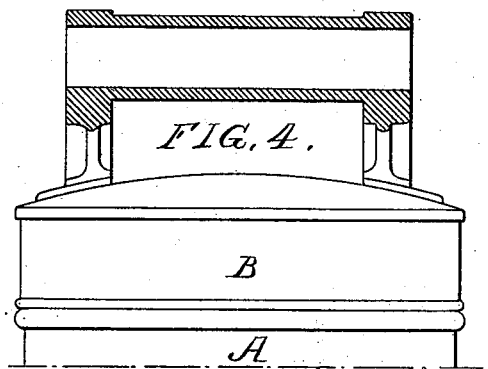
Witnesses:
J. M. Deemer
H. L. Fulenwider
Inventors:
John D. Reed and
James Cumming
by their Attorneys
Howson and Sons

United States Patent Office.

JOHN D. REED AND JAMES CUMMING, OF PHILADELPHIA, PA., ASSIGNORS TO ISAAC S. WILLIAMS AND HENRY N. WILLIAMS, OF SAME PLACE.

ICE-CREAM FREEZER.

SPECIFICATION forming part of Letters Patent No. 243,972, dated July 5, 1881.

Application filed April 25, 1881. (No model.)

*To all whom it may concern:*

Be it known that we, JOHN D. REED and JAMES CUMMING, both citizens of the United States and residents of Philadelphia, Pennsylvania, have invented certain Improvements in Ice-Cream Freezers, of which the following is a specification.

Our invention relates to improvements in that class of ice-cream freezers in which a cylindrical can containing the cream is vibrated in the ice-receptacle by a hand or hands applied to a handle on the lid of a can; and the object of our invention is to provide the lid of the can with a more substantial and permanent handle than those heretofore used, and to so construct the handle as to admit a bar, forming a supplementary handle, which affords increased facilities for operating the can.

In the accompanying drawings, Figure 1 is a side view of the cream-can of an ice-cream freezer, showing our improvement partly in section; Fig. 2, a vertical sectional view of the upper part of the can; Fig. 3, a sectional plan of Fig. 2; and Fig. 4, a modified form of handle, partly in section.

A is the cylindrical body of the can, and B the detachable lid, which, when in place, can not be turned independently of the can, owing to the fitting of a projection on one into a recess in the other.

D D are two stands, preferably of malleable iron, which are galvanized or coated with tin or suitable alloy, and the bases of which are secured to the top of the lid, preferably by solder. There is at the upper portion of each stand, at one side of the same, a projection, $b$, through which and through the stand extends an opening, $a$, and a short tube, G, intervenes between the two stands, its ends fitting snugly on the tubular projections $b$, to which the said tube is necessarily adjusted before the bases of the stands are secured to the lid.

Heretofore the handles for the lids of cream-cans have generally been made of tinned plate, and are more or less flimsy and insecure, for as the handles are used for vibrating the entire can and its contents in the ice-receptacle they are necessarily subjected to severe strains, which ordinary handles cannot long withstand.

The stands D and tube G may be cast in one piece, preferably of malleable iron, as shown in Fig. 4, if a large number of cans of the same size have to be made; but, as there are different sizes of cans, it is more economical to make the handle in three parts, so that it may be made longer or shorter, as the diameter of the can may suggest, by simply adjusting longer or shorter tubes to the stands, for it is important that large cans should have long handles, in order that they can be grasped by both hands.

An opening, extending entirely through the handle, permits the introduction therein of a bar, the projecting ends of which (shown by dotted lines in Fig. 1) may serve as supplementary handles, affording increased leverage.

We claim as our invention—

1. The combination of the lid of a cream-can with a handle composed of cast-iron stands D D and intervening tube G, substantially as set forth.

2. The handle composed of two stands, D D, each having a projection, $b$, and the intervening tube G, fitted to the said projections of the stands, substantially as set forth.

In testimony whereof we have signed our names to this specification in the presence of two subscribing witnesses.

JOHN D. REED.
JAMES CUMMING.

Witnesses:
HUBERT HOWSON,
HARRY SMITH.